United States Patent [19]

Sadler

[11] Patent Number: 5,031,288
[45] Date of Patent: Jul. 16, 1991

[54] METHOD OF MANUFACTURING A ROTOR ASSEMBLY

[75] Inventor: John H.R. Sadler, Derby, England

[73] Assignee: Rolls-Royce, plc, London, England

[21] Appl. No.: 591,557

[22] Filed: Oct. 1, 1990

[30] Foreign Application Priority Data

Nov. 7, 1989 [GB] United Kingdom ............... 8925135

[51] Int. Cl.⁵ .............................................. B21K 3/04
[52] U.S. Cl. ............................ 29/889.21; 29/889.22; 29/428; 29/505; 228/112; 228/115
[58] Field of Search ............... 29/889.21, 889.22, 428, 29/505; 228/112, 113, 115, 116, 3.1

[56] References Cited

U.S. PATENT DOCUMENTS

| 3,768,147 | 10/1973 | Berry et al. | 228/112 |
| 4,096,615 | 6/1978 | Cross | 29/889.21 |
| 4,529,452 | 7/1985 | Walker | 29/889.21 |
| 4,736,504 | 4/1988 | Jones | 29/889.21 |
| 4,864,706 | 9/1989 | Jenkel | 29/889.21 |
| 4,874,031 | 10/1989 | Janney | 29/889.21 |

FOREIGN PATENT DOCUMENTS

| 0258832 | 2/1979 | U.S.S.R. | 29/889.21 |
| 2109274 | 6/1983 | United Kingdom | 29/889.21 |

Primary Examiner—Irene Cuda
Attorney, Agent, or Firm—Oliff & Berridge

[57] ABSTRACT

A compressor rotor structure for a gas turbine engine is made by linear friction bonding stub rooted blades and separate platform pieces, to lands between slots in a compressor disc periphery. These results an integral structure in which the periphery of the disc has had metal removed so as to form the slots and the disc is thus lightened, and the stub roots and platform pieces cooperate to form the airflow inner annulus wall.

2 Claims, 1 Drawing Sheet

METHOD OF MANUFACTURING A ROTOR ASSEMBLY

BACKGROUND OF THE INVENTION

The present invention relates to a rotor assembly, and includes a method of achieving that assembly.

Specifically, the rotor assembly is of the kind wherein the blades, platforms and disc comprise an integral i.e. solid, structure.

It is known to form a single, integral structure from a plurality of metal parts, by pressing the parts together and at the same time, introducing relative reciprocatory motion therebetween, in the plane of the interfaces. The resulting friction generates heat of a sufficient intensity so as to melt or at least soften the metal on each side of the interface with the further result that the parts become one. Inevitably, some metal is displaced to form flash around the periphery of the joined volume.

The method of manufacture described hereinbefore is called "linear friction bonding", and one of its advantages is that it enables an integral structure to be achieved which is made up of parts, each of which has been manufactured in a way which generates the most desired characteristics therein.

Rotor assemblies for gas turbine engines, have been constructed by linear diffusion bonding each rotor blade to the scalloped periphery of a disc. In examples known to the applicant however, the blade platforms which, as the skilled man appreciates, cooperate to form the inner wall of the fluid flow annulus in a gas turbine engine, are either integral parts of the blades and are positioned at some point radially outwardly from the intended joint line, or alternatively are separate pieces which, after joining of the blades has been effected, are slipped into grooves in adjacent sides of respective pairs of blades. The arrangements make for a complicated structure which is difficult to achieve, bearing in mind the manipulative manner in which joining has to be effected.

SUMMARY OF THE INVENTION

The present invention seeks to provide an improved method of linear diffusion bonding a disc and a plurality of blades and platforms.

According to the present invention a method of achieving a linear friction bonded rotor structure comprises the steps of forming slots in the periphery of a rotor disc the lengths of which slots have at least a substantial directional component axially of the disc, forming the blades such that each includes a stub root, all of which stubs are similar in profile to, but larger than, lands on the disc periphery which are defined by the slots, forming a plurality of platforms which are similar in profile to said lands, linear friction bonding the blades to each alternate land via their stubs and linear friction bonding the platforms one to each remaining land, the combined widths of the stubs and lands being such as to form a substantially complete annular wall.

BRIEF DESCRIPTION OF THE DRAWINGS

The invention will now be described, by way of example and with reference to the accompanying drawings in which.

DESCRIPTION OF THE PREFERRED EMBODIMENT

Figure 1:
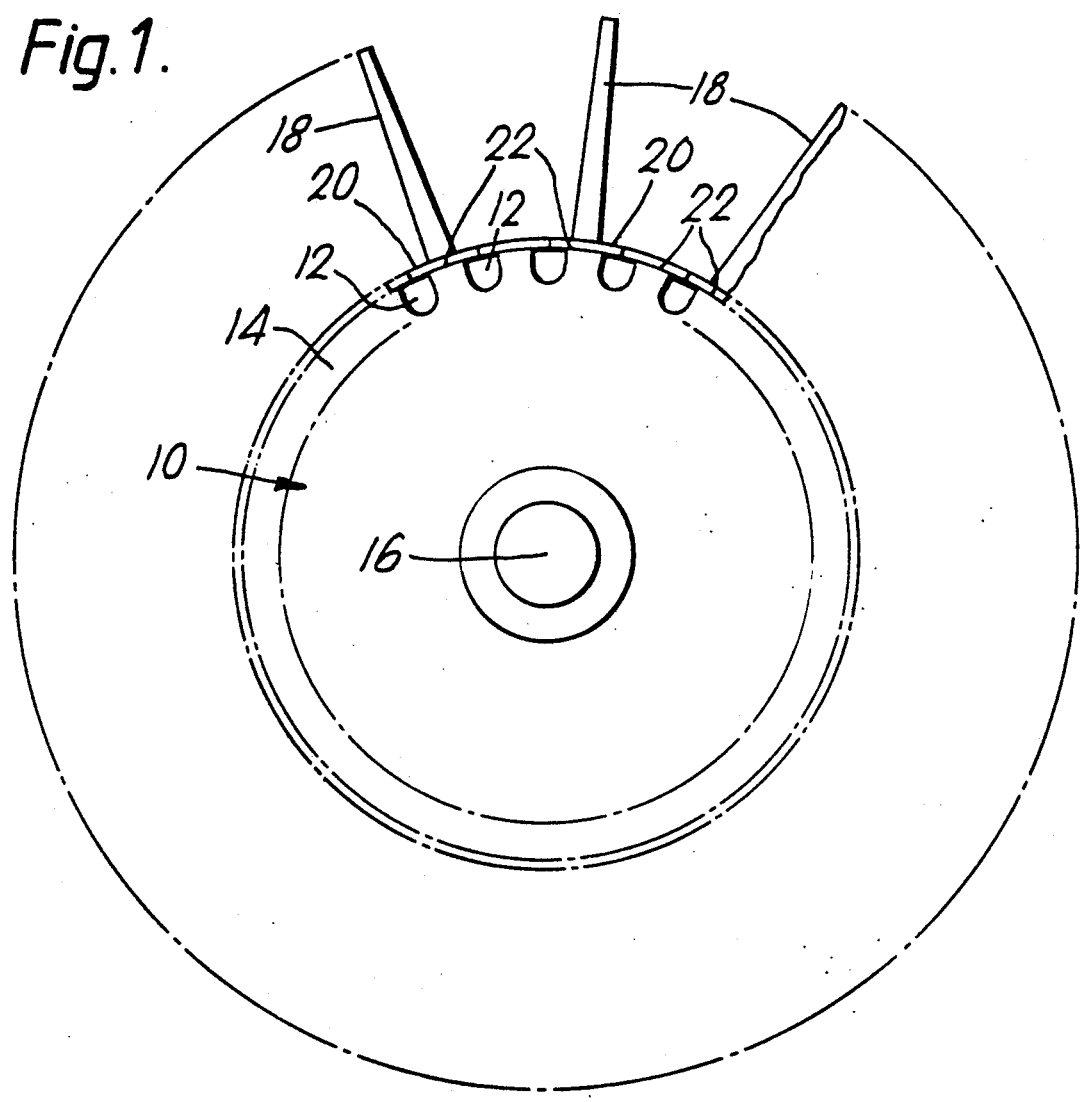
FIG. 1 is a diagrammatic view of a rotor disc and associated blades and platforms in accordance with the present invention.

Referring to FIG. 1, a rotor disc 10 e.g. of the kind used in a gas turbine engine, has a number of equi-angularly positioned slots 12 formed right through the thickness of its rim 14.

The slots 12 may be parallel with the axis of rotation 16 of the disc 10, but normally, they would be formed with their lengths lying at some angle relative to the axis of rotation 16, which angle has a substantial component in the direction of the axis of rotation 16. The attitude of the slots 12 which is adopted is controlled by the magnitude of the chordal dimensions and the twist, of rotor blades 18 which are to be attached to the rotor disc 10.

In accordance with the present invention, each of the blades 18 is first formed by forging or casting or any other suitable means, so as to include a stub 20 at its radially inner end with respect to the disc axis 16. In the example, the major profiles of the stubs 20 are similar to and overlap the major profiles of the lands 22 which are defined by the slots 12. In any event, the stubs should extend laterally of their respective blades, to positions which are at least flush with the nearest sides of respective slots, for reasons which will be explained later in this specification.

The blades 18 are positioned one on each alternate land 22 and are fixed there by generating relative reciprocatory movement between the stubs 20 and the lands 22 whilst simultaneously pressing each stub thereon. By this means sufficient heat is generated through friction, as to melt, or at least soften the material of the disc and the stubs at their interfaces, and so effect metallic joining i.e. linear friction bonding, of the elements, to form an integral structure.

A number of platforms 24 are provided and have major profiles which are similar to but, when the platforms 24 are affixed to respective lands 22 which are not covered by blade stubs 20, overlap those lands and, in the example, terminate at positions which are closely adjacent the sides of respective stubs 20.

The platforms 24 are affixed to their respective lands by the same method as described hereinbefore in connection with the blades 18 i.e. linear friction bonding.

A drawback experienced generally when construction by linear friction bonding is utilised, is that flash is generated i.e. the forcing together of the parts displaces metal in the plane of reciprocatory movement. The flash which will be formed by operation of the method described hereinbefore, will form in the areas bounded by the blade stubs 20, the platforms 24 and the edges of their respective lands 22. This is easily removable by the insertion of an appropriately shaped tool (not shown) into and through the slots 12.

The tool may be a reciprocatory cutter or, alternatively, it could be an electrode of the kind used in electro-chemical machining.

The construction of a rotor stage as described herein is advantageous, in that it obviates those lumps of metal which in prior art arrangements effectively only serve to divide the grooves in which blade roots fit and consequently form parasitic weight which in turn increases the hoop stresses in the disc.

Figure 2:
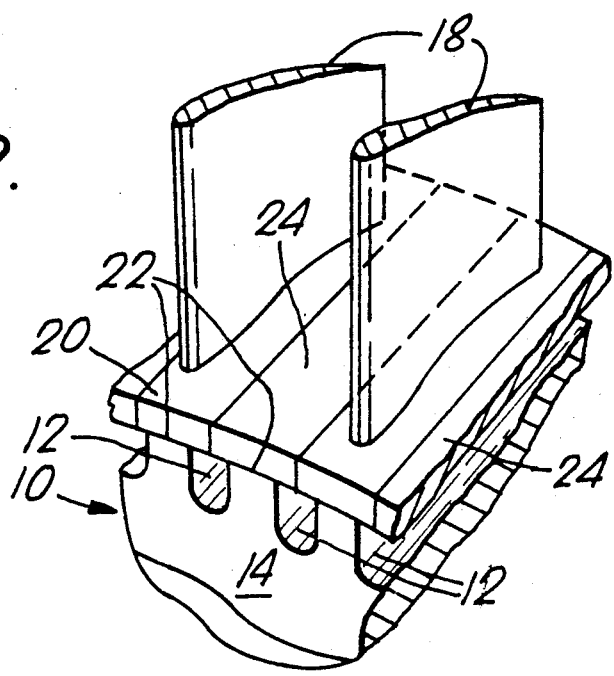
FIG. 2 is an enlarged pictorial part view of FIG. 1.

Referring briefly to FIG. 2, in this view, the arrangement of FIG. 1 is depicted pictorially and as all of the parts in FIG. 2 are also those depicted in FIG. 1, they are given common numerals.

I claim:

1. A method of making a rotor assembly comprising the steps of:

forming equi-angularly spaced slots and lands in a periphery of a rotor disc, which slots have at least a substantial directional component axially of the rotor disc;

forming blades for the rotor assembly such that each blade includes a stub root having a major profile which is similar in shape to and at least dimensionally the same as profiles of the lands;

forming a plurality of platforms having major profiles which are similar to but larger than the profiles of the lands, at least in a direction peripherally of the rotor disc;

linear friction bonding the blades to alternate lands via their respective stub roots; and linear friction bonding the platforms one to each remaining land, so as to form, with the stub roots, a substantially complete annular wall.

2. A method of making a rotor assembly as claimed in claim 1, including the step of forming the stub roots with major profiles which are larger than the profiles of the lands, at least in a direction peripherally of the disc.

* * * * *